Jan. 1, 1957 S. B. COHN ET AL 2,776,406
POWER MEASURING INSTRUMENT AND METHOD
Filed Feb. 12, 1953
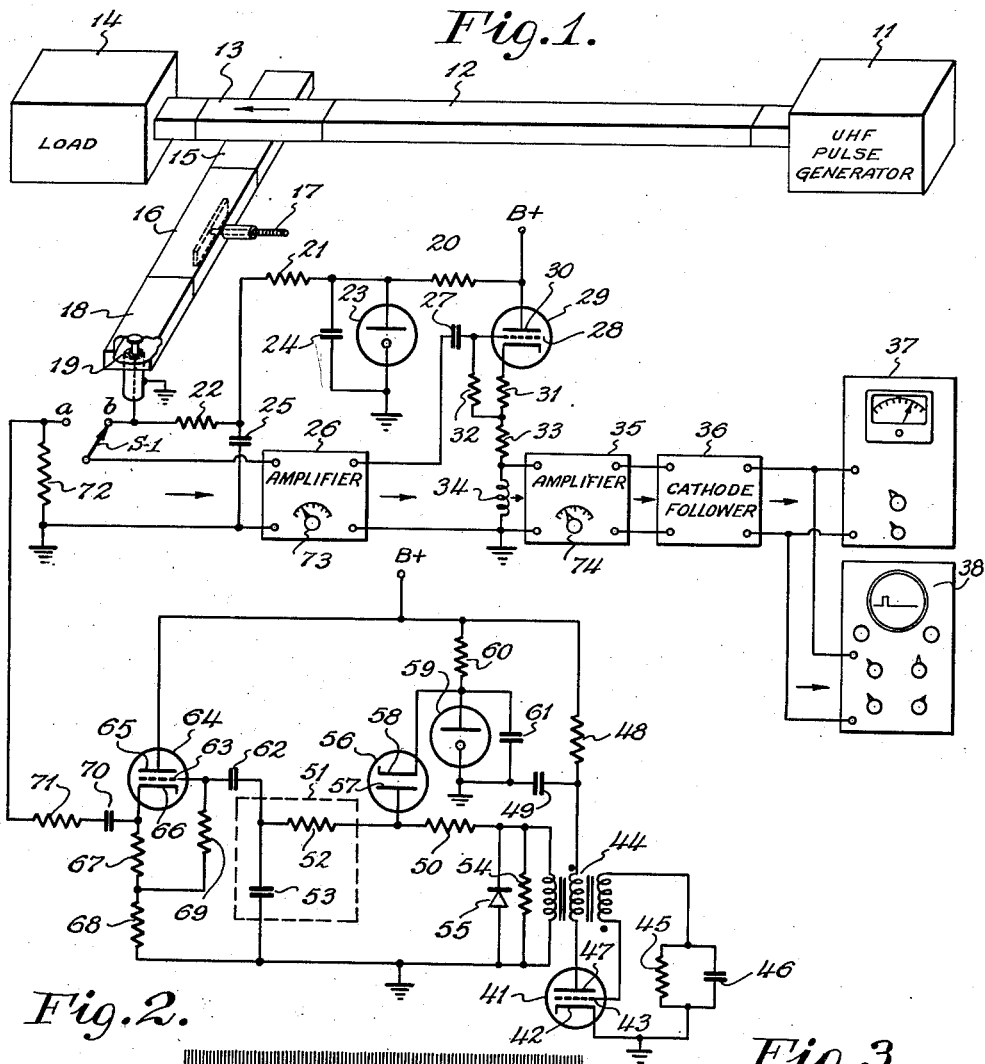
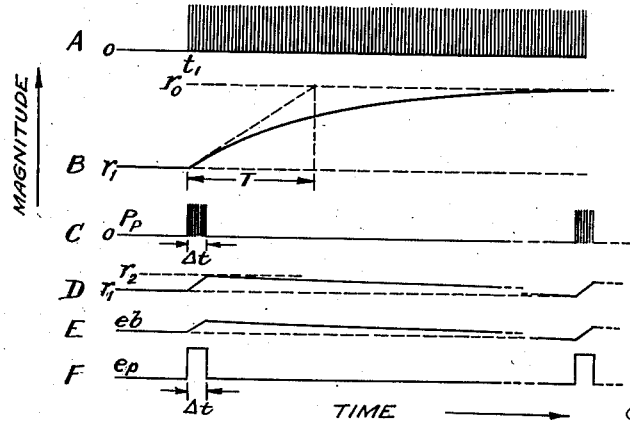
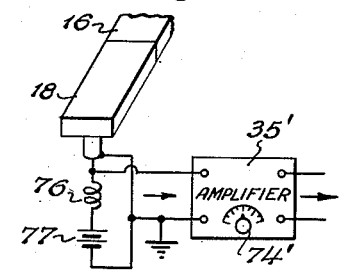
INVENTORS
SEYMOUR B. COHN
RUDOLF E. HENNING
BY
Thomas M. Ferrill, Jr.
ATTORNEY

United States Patent Office 2,776,406
Patented Jan. 1, 1957

2,776,406
POWER MEASURING INSTRUMENT AND METHOD

Seymour B. Cohn, Flushing, and Rudolf E. Henning, New York, N. Y., assignors to Sperry Rand Corporation, a corporation of Delaware Application February 12, 1953, Serial No. 336,468

13 Claims. (Cl. 324—103)

This invention relates to peak power measuring apparatus, and in particular to an instrument for measuring the peak value of the effective power delivered by a pulse generator to a load.

An object of this invention is to provide an instrument for measuring with increased accuracy the peak value of the effective power delivered by a U. H. F. pulse generator to a load.

Another object of the invention is to measure the peak value of the effective power supplied to a load by a generator producing repetitive short pulses of U. H. F. energy.

Yet another object of the invention is to provide a method for enabling a thermally responsive resistor element having a long thermal response time to be employed for the measurement of the peak value of short pulses of power.

Still another object of the invention is to provide a power measuring instrument for producing an indication proportional to the rate of change of resistance of a thermal resistor element responsive to short pulses of power.

In accordance with the present invention, there is introduced a power meter responsive to the peak value of the effective power of a series of pulses, and employing a thermally responsive resistor element having a thermal response time which is long in comparison to the duration of the pulses of power whose peak effective value is to be measured. The resistance of the resistor element increases from an initial value to a higher value throughout the duration of the applied pulses of power, and the rate of rise or slope of the resistance change varies directly as the peak value of the pulses of power. A current is passed through the resistor element to produce a voltage drop thereacross varying according to its change in resistance. The voltage across the resistor element is applied to a differentiating and indicating circuit for measuring the rate of change of the voltage across the resistor element which is an indication of the peak effective value of the pulses of power. The resistor element may be situated within a section of wave guide to which is supplied an attenuated predetermined percentage of the pulse power to be measured, such as power from a high powered U. H. F. pulse generator. The peak power meter is initially calibrated in order to indicate absolute peak effective values of power by supplying to it pulses of power having a known or calculated peak value. A circuit for periodically checking the calibration is provided which supplies to the peak power meter an integrated pulse voltage having a known constant equivalent peak effective value.

The above objects of and the brief introduction to the present invention will be more fully understood and further objects and advantages will become apparent from a careful study of the following detailed description in connection with the drawings wherein, Fig. 1 shows a composite block and schematic diagram of the pulse responsive peak power meter of the invention;

Fig. 2 illustrates several waveforms useful in explaining the operation of the peak power meter of Fig. 1; and Fig. 3 illustrates an alternative arrangement for the connection of the thermally responsive resistor in the pulse responsive peak power meter of Fig. 1.

Referring to Fig. 1, short pulses of power from a U. H. F. pulse generator 11, such as a radar transmitter, are supplied through a section of wave guide 12 and through a directional coupler 13 to a matched load 14. These pulses of power, for example, may have a pulse duration in the range from a fraction of a microsecond to 10 microseconds, and a repetition frequency in the range from 50 to 5000 pulses per second.

A predetermined small percentage of the pulse power supplied to the matched load 14 from generator 11 is extracted by the directional coupler 13, which may be of the "cross-guide" type as illustrated in Fig. 1 and further disclosed in U. S. Patent No. 2,602,859, and the extracted portion of the pulse power from generator 11 is coupled through the directional coupler wave guide arm 15 to a variable wave guide attenuator 16 having a calibrated dial or scale 17. The calibrated variable wave guide attenuator 16 may be of any type known in the art having the proper frequency and bandwidth, and providing a range of attenuation such that the peak effective power output from the attenuator may be reduced to a level of approximately 100 milliwatts. One suitable type is the Model 134 variable wave guide attenuator manufactured by the Sperry Gyroscope Company, and having a range of attenuation from almost zero to 45 decibels.

The attenuated pulse power from attenuator 16 is coupled to a wave guide section 18 containing a thermally responsive resistor element 19. The wave guide section 18 may be of the type disclosed in U. S. Patent Re. 23,-131 and known in the art as a "barretter mount." The thermally responsive resistor element 19, accordingly, may be a barretter of the type disclosed in U. S. Patent No. 2,468,793. One such barretter is the Model 821 manufactured by the Sperry Gyroscope Company.

The thermally responsive resistor element or barretter 19 is mounted within the barretter mount as shown and described in the above-mentioned U. S. Patent No. Re. 23,131. The barretter mount may be tunable as illustrated in this patent or it may be designed as a fixed pre-tuned unit as shown in Fig. 1. One terminal of the barretter 19 is conductively joined within the wave guide barretter mount to one of the broad walls, and the other terminal is insulated from the barretter mount and brought out through an opening in the opposite broad wall to a coaxial connector attached to the outside of the wall. The outer conductor of the coaxial connector, which is electrically connected to the outside wall of the barretter mount, is further connected to a common ground terminal. The inner conductor of the coaxial connector, which is connected to one terminal of the barretter, is further connected to terminal $b$ of switch S-1. The barretter mount 18 is designed to have a minimum of capacity across this output connector.

A substantially constant direct current is passed through the barretter 19 to enable a voltage drop to be developed across its terminals. This direct current is derived from a source of positive potential illustrated as B+ in Fig. 1 and passes through resistors 20, 21, 22 and through the barretter 19 to ground. A voltage regulator tube 23, such as a type 5787, maintains the voltage across its terminals at a constant value of, for example, 100 volts. The resistors 21 and 22 reduce the voltage applied across the barretter element 19, and their resistance values are chosen such that a safe operating current, for example 8.5 milliamperes, is passed through the barretter. The resistance of these resistors is high in comparison with the resistance of the barretter, which has a resistance, for example, of approximately 200 ohms when 8.5 milliamperes of direct current is passing through it, in order that the direct current through the barretter remains substantially constant as its resistance changes. Condensers 24 and 25 bypass any alternating currents to ground, such as power supply ripple or voltage regulator tube noise, in order that only direct current is supplied to the barretter through resistor 22.

The barretter 19 is thermally responsive to the power supplied to it which causes its resistance to increase as its temperature rises. This response characteristic is illustrated in Fig. 2. For example, assume that a constant power of several milliwatts is suddenly applied to a barretter at a time $t_1$ as illustrated by the waveform A in Fig. 2. This pulse of power raises the temperature of the barretter and causes its resistance to increase from an initial value $r_1$ to a final value $r_0$ in accordance with the response curve of waveform B. This response curve shows that the resistance change of the barretter is gradual and not instantaneous, and follows the equation $$(r_0 - r_1)\left(1 - \epsilon^{-\frac{t}{T}}\right)$$

where $r_1$ is the initial value and $r_0$ is the final value of the resistance of the barretter, T the thermal response time constant of the barretter, and $\epsilon$ the Naperian base of logarithms. The time constant T is the time required for the resistance to have increased from its initial value $r_1$ to 63.7 percent of the value $r_0 - r_1$. The Model 821 barretter manufactured by the Sperry Gyroscope Company has a time constant T of approximately 320 microseconds.

When short pulses of power having a constant peak value $P_p$ and a duration $\Delta t$, as illustrated in waveform C, are applied to the barretter 19, its response characteristic will appear as shown by waveform D when the duration $\Delta t$ is appreciably less than the time constant T of the barretter. For pulses of power having a constant peak effective value, the resistance of the barretter rises substantially linearly from an initial value $r_1$ to a value $r_2$ for the duration $\Delta t$ of each pulse of power. Thereafter, the resistance reduces exponentially to a lower value before the arrival of a following pulse. The rate of rise or slope of the resistance of the barretter during the pulse interval $\Delta t$ is directly proportional to the peak effective value of the applied pulse power $P_p$ and is substantially independent of the duration $\Delta t$ as long as $\Delta t$ is short in comparison with the time constant T. In other words, the barretter serves as an integrator of each applied pulse of power during each pulse time interval $\Delta t$.

For pulses of power whose instantaneous peak value varies throughout the duration $\Delta t$ of each pulse, the barretter serves to integrate these variations to produce a resistance change having variations of its instantaneous slope.

The effective value of the peak power $P_p$ must always be less than the value which will burn out the barretter, and a safe level for the Model 821 barretter mentioned above is in the vicinity of 100–200 milliwatts. The directional coupler 13 and the variable attenuator 16 provide the necessary attenuation of the output power from a high powered U. H. F. pulse generator, such as generator 11, to reduce the peak effective power to this safe level.

Since a substantially constant direct current is flowing through barretter 19, changes in its resistance cause corresponding changes in the voltage drop across its terminals. The voltage drop $e_b$ across the barretter thus appears as illustrated in waveform E. The slope of the rise in voltage $e_b$ during the pulse interval $\Delta t$ varies directly as the peak effective value of the pulse of power $P_p$ throughout the interval $\Delta t$, and is independent of the duration of the time interval $\Delta t$ as long as $\Delta t$ is short compared to the time constant T. Furthermore, variations of the slope or rise in voltage $e_b$ during $\Delta t$ as for applied pulses of power whose instantaneous peak value varies throughout the pulse duration will be accurately reproduced across the barretter terminals.

The time constant of a barretter and its initial resistance while passing a direct current of 8.5 milliamperes can be controlled in manufacture to possess selected constant values to a high degree of accuracy. Therefore, the slope of the barretter voltage drop $e_b$ during the pulse interval $\Delta t$ is a highly accurate indication of the peak effective power $P_p$. Accordingly, the peak effective values of the pulses of power may be determined by measuring the slope of the barretter voltage drop $e_b$ during the pulse intervals $\Delta t$.

To measure this slope, the voltage drop $e_b$ across the barretter 19 is applied through position $b$ of switch S–1 to an amplifier 26 having sufficient bandwidth to uniformly amplify the frequency components of the voltage $e_b$. The output signal voltage from the output terminal of the amplifier 26 is coupled through condenser 27 to control grid 28 of a triode tube 29. The anode 30 of the tube is coupled directly to a source of positive potential identified as B+. Control grid bias for the tube is provided by cathode resistor 31, the control grid 28 being returned to the lower end of this resistor 31 through a series grid resistor 32. A differentiating circuit of the conventional series resistance, shunt inductance type is connected in the cathode output circuit of tube 29. The total series resistance of the differentiating circuit includes the source resistance of the triode tube operating as a cathode follower, the resistor 31, and a series resistor 33. The pulse output voltage from the differentiating circuit appears across inductor 34, and is illustrated as a voltage of waveform F in Fig. 2. The peak value of the pulse voltage across inductor 34, which represents the derivative of the barretter output voltage $e_b$, varies as the slope of the barretter voltage $e_b$ and, accordingly, varies as the peak effective value of the pulses of power $P_p$. Moreover, the shape of the pulse voltage $e_p$ of waveform F throughout $\Delta t$ is similar to the shape of the envelope of the pulses of power of waveform C throughout $\Delta t$.

The differentiating circuit must operate over a frequency band which is broad enough to include all the frequency components of the barretter output voltage $e_b$. The width of this frequency band is primarily determined by the rise and decay time of the pulses of power applied to the barretter, and will extend from several cycles per second to a few megacycles per second for pulses of short duration.

The pulse voltage across the inductor 34 is applied to the input terminals of amplifier 35, and the amplified output pulse voltage is coupled through cathode follower 36 to a peak pulse voltmeter 37 and to a wide band oscilloscope 38. The bandwidth of amplifier 35 is substantially equal to the bandwidth of the amplifier 26. The peak pulse voltmeter 37, which may be of a type similar to the Model 80A manufactured by the C. G. S. Laboratories, Inc., indicates the instantaneous peak value of the amplified pulse voltage of waveform F, and the wide band oscilloscope 38 displays the waveform of the pulse voltage. The instantaneous peak value of the pulse voltage as indicated by the peak pulse voltmeter 37 varies as the peak effective value of the applied pulses of power illustrated in waveform C.

In order to measure the absolute peak value of the effective power, the peak power measuring instrument of Fig. 1 must be calibrated. One method for calibrating the instrument is to apply pulses of power of known average power, repetition rate, pulse duration, and pulse envelope shape, and to calibrate the deflection of the peak pulse voltmeter 37 according to the computed peak effective value of the pulses of power. The peak effective value of the applied pulses of power may be computed by measuring their average power with conventional average power measuring instruments, dividing the average power by the duty cycle, and correcting the quotient by a factor determined by the envelope wave shape of the pulses of power. The waveform of the envelope of the pulses of power may be observed on the cathode ray tube screen of oscilloscope 38. For square pulses of substantially flat tops and perpendicular sides, the peak effective value of the pulses of power is equal to the measured average power divided by the duty cycle. For triangular pulses, the peak effective value is equal to twice the measured average power divided by the duty cycle.

The barretter element 19 operating with a constant current flowing through it has a limited dynamic range over which its resistance can be changed by the application of pulses of power. The upper limit of the applied peak power is that which burns out the barretter. The shorter the pulses, the higher their allowable peak values before damaging the barretter and the larger the dynamic range over which the resistance may be changed. The lower limit of applied peak power that can be measured is that which just exceeds the random noise level produced by the barretter and the amplifier 26. The voltage drop across the barretter resulting from applied pulses of power must be sufficient to exceed this random noise voltage.

In order to measure the peak values of pulses of high effective power, the peak effective value of the pulse power supplied to the barretter element 19 is attenuated to a reference level, for example, 100 milliwatts, and the peak power meter is calibrated such that pulse voltmeter 37 produces a fixed reference deflection or indication when a peak effective power of 100 milliwatts is supplied. Peak powers in excess of the 100 milliwatt reference level are attenuated by the calibrated variable attenuator 16 to a level that just produces the fixed reference deflection on pulse voltmeter 37 representing 100 milliwatts, and pulses of power should always be attenuated before application to the peak power meter so as never to exceed this reference level. The total attenuation provided between a source of pulse power, such as U. H. F. pulse generator 11, and the barretter element 19 necessary to produce the reference deflection of pulse voltmeter 37 must be determined in order to compute the peak effective value of the pulses of power from the source. With a total attenuation of, for example, 20 decibels, including the attenuation in directional coupler 12 and attenuator 16, the peak effective value of the pulse power is equal to 20 decibels above 100 milliwatts, or 10 watts peak effective power.

While it is convenient to supply the barretter 19 with pulses of power having a constant peak effective value of 100 milliwatts, it is also possible to calibrate the peak voltmeter 37 directly in milliwatts to indicate the peak effective value of the unknown pulses of power as long as the pulses of power are within the dynamic range of the barretter.

The calibration of the peak power meter may be checked prior to each measurement by the calibrating circuit included in Fig. 1. This circuit provides an integrated pulse output voltage having a waveform similar to the barretter output voltage $e_b$ illustrated as waveform E in Fig. 2. The integrated pulse output voltage has a constant slope during its rise time which is made exactly equal to the slope of the barretter output voltage $e_b$ for the condition that the peak effective value of the applied pulse power to the barretter is exactly equal to 100 milliwatts.

The calibrating circuit comprises a conventional blocking oscillator for producing short positive output pulses of a few microseconds duration, for example, and at a pulse repetition rate of approximately one thousand pulses per second. The blocking oscillator circuit employs a triode tube 41 whose cathode 42 is coupled to a common ground terminal and whose control grid 43 is coupled to one terminal of the grid winding of blocking oscillator transformer 44, the other terminal of this grid winding being coupled through the parallel connection of grid resistor 45 and grid condenser 46 to ground. The anode 47 is coupled through the plate winding of blocking oscillator transformer 44 and through resistor 48 to a source of positive potential identified as B+. A condenser 49 bypasses the junction between resistor 48 and the plate winding to ground.

One terminal of the output winding of the blocking oscillator transformer is connected to ground and the other terminal is coupled through a series resistor 50 to an input terminal of integrating network 51. This network comprises a series connected resistor 52 and condenser 53 between the input terminal and ground. A loading resistor 54 and a rectifier 55 are connected across the output winding of the blocking oscillator transformer. The rectifier prevents negative output pulses from being developed across this winding.

A diode tube 56 having its anode 57 connected to the input terminal of network 51 and its cathode 58 connected to a source of constant positive potential operates as a biased diode clipper to set the peak value of the positive output pulses appearing at anode 57 equal to the constant positive potential at the diode cathode 58. To accomplish this, the positive output pulses from the blocking oscillator transformer 44 must have an appreciably higher peak voltage than the value of the constant potential at cathode 58. As a result, the short positive pulses applied to the input of the integrating network 51 have a constant peak value.

The constant positive potential at the cathode 58 is obtained from a voltage regulator tube 59, such as a type 5651. A series resistor 60 couples the positive terminal of the regulator tube to B+, the negative terminal of this regulator tube being connected to ground. A condenser 61 connected across the voltage regulator tube 59 bypasses any noise voltages generated by the tube, and maintains a low impedance across the voltage regulator tube to the pulses of current that flow through diode 56 during each clipping interval.

The integrating network 51 has a time constant that is long compared to the duration of the clipped positive pulses, and may be of the same order of magnitude as the time constant of barretter 19. The integrated pulse output voltage across condenser 53 is applied through coupling condenser 62 to the control grid 63 of a triode cathode follower tube 64. Anode 65 of this tube is coupled to B+. Cathode 66 is coupled through series cathode resistors 67 and 68 to ground. Grid resistor 69 is coupled between control grid 63 and the junction between cathode resistors 67 and 68.

The cathode follower stage provides a low output impedance for the integrated pulse output voltage from integrator network 51 and the output voltage from cathode 66 is coupled through condenser 70 to a resistor voltage divider comprising a series resistor 71 and a shunt resistor 72. This shunt resistor 72 has a value approximately equal to the resistance of barretter 19, i. e., 200 ohms. The junction between these resistors 71 and 72 is coupled to terminal $a$ of switch S–1. The resistor voltage divider attenuates the integrated pulse output voltage from the cathode follower stage to a level which when supplied through terminal $a$ of switch S–1 to the input of amplifier 26, will produce the same indication on pulse voltmeter 37 as produced by a peak effective power of 100 milliwatts supplied to the barretter 19. Thus, the calibrator circuit produces an output voltage, similar to waveform E of Fig. 2, having a slope during its rise time that is the same as the slope of the barretter output voltage $e_b$ during $\Delta t$ when a peak effective power of 100 milliwatts is supplied to the barretter.

The slope of the integrated pulse output voltage from the calibrating circuit remains constant for long periods of time because it is dependent upon precision components such as the resistor voltage divider 71 and 72, the integrating network 52 and 53, and the voltage regulator tube 59, all of which are chosen to have the highest quality available. Therefore, when once adjusted, the calibrator circuit can be relied upon to produce an output voltage that simulates the output voltage from the barretter 19 when a peak effective power of 100 milliwatts is supplied to the barretter. The calibrator circuit thus provides a simple and convenient method for checking or recalibrating the peak power meter each time it is employed to measure peak effective power.

Amplifiers 26 and 35 are provided with gain controls 73 and 74 respectively, which may be adjusted and set during calibration to produce the reference deflection on pulse voltmeter 37 representing a peak effective power of 100 milliwatts.

The peak power measuring instrument of this invention enables an operator to measure conveniently and accurately the peak value of the effective power supplied by a U. H. F. pulse generator to a load. Summarizing briefly, with the instrument coupled to a source of power whose peak effective value is to be measured, as illustrated in Fig. 1, the operator first sets switch S-1 to position $a$ to check the instrument's calibration. The simulated voltage from the calibrating circuit should produce the reference deflection on pulse voltmeter 37 representing the 100 milliwatt reference level. The gain of one or both of amplifiers 26 and 35 may be adjusted to obtain this reference deflection. The calibrated variable attenuator 16 is adjusted for maximum attenuation in order that the peak effective value of the pulses of power supplied to the barretter will not exceed 100 milliwatts. The switch S-1 is then set to position $b$ and the attenuation through attenuator 16 is reduced until the pulse voltmeter 37 indicates the 100 mlliwatt reference deflection. The attenuation through attenuator 16 is read from its calibrated dial or scale 17 and added to the predetermined fixed attenuation through directional coupler 12 to obtain the total attenuation between pulse generator 11 and barretter 19. If, for example, the total attenuation is 20 decibels, then the pulse generator is supplying 10 watts of peak effective power to load 14 as previously explained.

The fixed attenuation through the directional coupler 12 can be measured with a source of continuous wave power and conventional average power measuring apparatus if it is unknown. Additional fixed or variable attenuators may be inserted between wave guide arm 15 and barretter mount 18 if additional attenuation is needed in measuring the peak effective values of very large pulse powers.

An alternative arrangement for employing the barretter element 19 in the pulse responsive peak power meter is illustrated in Fig. 3. In this embodiment, the barretter element 19 is connected in series with an inductor 76 and a source of constant potential 77. The inductor 76 and a source of constant potential 77. The value of the potential of source 77 is chosen so that a direct current of approximately 8.5 milliamperes flows through the barretter element. The output voltage across the barretter is applied to the input of an amplifier 35', corresponding to but providing more gain than amplifier 35 in Fig. 1.

Pulses of power applied to the barretter elements 19 cause its resistance to increase recurrently as explained heretofore. Since the potential of source 77 is maintained constant, the current flowing in the barretter must decrease as the barretter resistance increases. The inductor 76 tends to oppose any change in current flowing through it, and as a result produces across its terminals a voltage varying as the rate of change of this current. Since the current flowing through the barretter and the inductor varies as the integral of the pulse of power applied to the barretter, the rate of change of this current which produces the voltage drop across the inductor must vary as the peak effective value of the pulses of power applied to the barretter. Accordingly, the voltage drop across the inductor 76 varies as the envelope of the pulses of power. This voltage drop must also appear across the barretter element because the potential of source 77 is constant. Thus, the peak value of the pulses of voltage applied to the input of amplifier 35' is a representation of the peak effective value of the applied pulses of power.

The value of the inductance of inductor 76 is chosen such that it possesses inductive reactance over the frequency band which includes all the frequency components contained in the envelope of the pulses of power. In other words, the value of the inductance is so chosen that the parallel resonant frequency of inductor 76 and the capacity across the inductor, including the input capacity of amplifier 35,' is higher than the highest frequency component contained in the envelope of the pulses of power.

This embodiment of the peak power meter must also be initially calibrated such as supplying to the barretter element 19 pulses of power of known peak effective value in the same manner as has been previously described in connection with Fig. 1. Furthermore, to provide a convenient method for periodically checking the calibration of this embodiment, the calibrating circuit illustrated in Fig. 1 must be modified to produce short output pulses having a predetermined constant peak value. This modification consists in removing the integrating network 51, coupling the anode 57 of diode 56 through condenser 62 to control grid 63, and readjusting the level of the short output pulses across resistor 72. The level of these short output pulses must be such that when applied to the input of amplifier 35' for calibration checking, they will produce an indication on indicator 37 which is the same as the indication produced when a peak effective power of 100 milliwatts is supplied to the barretter element 19 and the barretter output voltage is applied to the input of the amplifier 35'.

The operating procedure for making a peak power measurement with this embodiment of the peak power meter is the same as described above in connection with Fig. 1.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A pulse responsive peak power meter comprising in combination, a thermally responsive resistor element, means adapted for supplying thereto a predetermined percentage of the pulse power to be measured, said thermally responsive resistor having a time constant that is long compared to the duration of the pulses of power to be measured and being responsive to said pulses of power for producing a rate of change of its resistance dependent upon the peak value of said pulses of power, the rate of change of resistance of said thermally responsive resistor element being substantially independent of variation in the duration of said pulses of power, means coupled to said thermally responsive resistor for supplying a substantially constant current therethrough whereby the voltage drop thereacross varies according to the variation of its resistance, a first amplifier means coupled to said thermally responsive resistor for amplifying the voltage drop thereacross. a differentiating circuit coupled to the output of said amplifier, a second amplifier coupled to said differentiating circuit, and a peak voltage indicator coupled to the output of said second amplifier.

2. A pulse responsive peak power meter comprising in combination, a thermally responsive resistor element, means adapted for supplying a predetermined percentage of the pulse power to be measured to said thermally responsive resistor, said thermally responsive resistor having a time constant that is long compared to the duration of the pulses of power to be measured and being responsive to said pulses of power for producing a rate of change of its resistance varying as the peak value of said pulses of power, the rate of change of resistance of said thermally responsive resistor element being substantially independent of variation in the duration of said pulses of power, means coupled to said thermally responsive resistor for supplying a substantially constant current therethrough whereby the voltage drop thereacross varies according to the variation of its resistance, and means coupled to said thermally responsive resistor for measuring the rate of change of said voltage drop throughout the duration of said pulses of power, said measuring means being substantially independent of the magnitude of said voltage drop.

3. A pulse responsive peak power meter comprising in combination, a thermally responsive resistor element, said resistor element having a thermal response time that is long compared to the duration of the pulses of power to be measured and being responsive to said pulses of power for producing a rate of change of its resistance varying as the peak value of the pulses of power, the rate of change of resistance of said thermally responsive resistor element being substantially independent of variation in the duration of said pulses of power, means coupled to said resistor element for passing a direct current therethrough, whereby the change in the voltage drop thereacross varies as the product of the change in resistance of said resistor element and the current passing therethrough, and means coupled to said resistor element including a rate responsive circuit for measuring the rate of change of said voltage drop throughout the duration of said pulses of power, said measuring means being substantially independent of the magnitude of said voltage drop.

4. A pulse responsive peak power meter comprising in combination, a thermally responsive resistor element, said resistor element having a thermal response time that is long compared to the duration of the pulses of power to be measured and being responsive to said pulses of power for producing a rate of change of its resistance varying as the peak value of the pulses of power, the rate of change of resistance of said thermally responsive resistor element being substantially independent of variation in the duration of said pulses of power, and means coupled to said resistor element including a rate responsive circuit for producing an indication proportional to the rate of change of resistance of said resistor element, said producing means being substantially independent of the amount of said change of resistance.

5. The apparatus as defined in claim 4 wherein said rate responsive circuit, included in said means coupled to said resistor element for producing an indication proportional to the rate of change of resistance of said resistor element, comprises an inductor coupled in series with said resistor element.

6. The apparatus as defined in claim 4 wherein said means coupled to said resistor element including a rate responsive circuit for producing an indication proportional to the rate of change of resistance of said resistor element includes a first amplifier coupled to said resistor element, a differentiating circuit including an inductor coupled to the output of said first amplifier, a second amplifier coupled to the output of said differentiating circuit, and a peak voltage indicator coupled to the output of said second amplifier.

7. The apparatus as defined in claim 4 further comprising a calibrating means including a pulse generator means, a pulse amplitude limiting means coupled to the output of said pulse generator means, an integrating circuit coupled to the output of said pulse limiting means, attenuator means coupled to the output of said integrating circuit, and means for selectively decoupling said indication producing means from said resistor element and coupling it instead to said attenuator means.

8. A pulse responsive peak power meter comprising in combination, a thermally responsive resistor element, said resistor element having a thermal response time that is long compared to the duration of the pulses of power to be measured and being responsive to said pulses of power for producing a change of its resistance during each pulse at a rate proportional to the peak value of said pulses of power, the rate of change of resistance of said thermally responsive resistor element being substantially independent of variation in the duration of said pulses of power, means coupled to said resistor element for supplying direct current power thereto, means including a differentiating circuit coupled to said resistor element for producing an output voltage varying in intensity as the rate of change of resistance of said resistor element, the intensity of said output voltage being substantially independent of the amount of said change of resistance, and amplifying and indicating means coupled to said last-named means for indicating the intensity of said output voltage.

9. The apparatus as defined in claim 8 wherein said means coupled to said resistor element for supplying a direct current power thereto includes a source of substantially constant voltage, and wherein said means including said differentiating circuit includes an inductor coupled between said resistor element and said source of substantially constant voltage.

10. In combination, a thermally responsive resistor element, means including microwave energy conveying means coupled to said thermally responsive resistor element for supplying pulses of microwave energy thereto, means for continuously supplying direct current power to said thermally responsive resistor element, means including a differentiating circuit coupled to said thermally responsive resistor for producing a finite output signal during changes of its resistance and for producing null output signal during periods when its resistance is substantially constant, the intensity of said finite output signal from said means including said differentiating circuit varying according to the rate of change of resistance of said thermally responsive resistor and being substantially independent of the amount of said change of resistance, and amplifying and indicating means coupled to said last-named means and responsive to said finite output signal for indicating the intensity of said pulses of microwave energy supplied to said thermally responsive resistor element.

11. A pulse responsive peak power meter comprising, in combination, a section of hollow wave guide of rectangular cross section, said section of wave guide having an open end and a closed end, a thermally responsive resistor element situated within said section of wave guide and extending thereacross from one of its broad walls to the other broad wall, one of the terminals of said resistor element being conductively joined to one of said broad walls, the other broad wall having an opening therein adjacent the other terminal of said resistor element, conductor means insulated from said wave guide and extending through said opening for conductive coupling to the other terminal of said resistor element, means coupled between said conductor means and said wave guide for passing a direct current through said resistor element, means for supplying a predetermined percentage of the pulse power to be measured to said resistor element through the open end of said section of wave guide, said resistor element having a thermal response time that is long compared to the duration of the pulses of power to be measured and being responsive to said pulses of power for producing a rate of change of its resistance varying according to the peak value of said pulses of power, the rate of change of resistance of said thermally responsive resistor element being substantially independent of variation in the duration of said pulses of power the change in the voltage drop across said resistor element varying as the product of the change in resistance of said resistor element and the current passing therethrough, and means conductively coupled between said conductor means and said wave guide including a rate responsive circuit for producing an indication proportional to the rate of change of said voltage drop, said means being substantially independent of the magnitude of said voltage drop.

12. The method of measuring the peak value of short pulses of power consisting of the steps of applying the pulses of power to be measured to a thermally responsive resistor element, said thermally responsive resistor producing a rate of change of resistance therein varying according to the peak value of said short pulses of power, supplying a substantially constant current to said thermally responsive resistor for producing a voltage across said resistor element varying according to the product of said substantially constant current and the resistance of said resistor element, amplifying said produced voltage, differentiating said amplifier voltage, and measuring the magnitude of the differentiated voltage.

13. The method of measuring the peak value of short pulses of alternating current power consisting of the steps of applying the pulses of power to be measured to a thermally responsive device for heating said thermally responsive device, said thermally responsive device producing a change in its resistance due to said heating, measuring the rate of change of resistance of said thermally responsive device throughout the duration of said short pulses of power, and indicating the measured rate of change of resistance.

References Cited in the file of this patent

UNITED STATES PATENTS

| | | |
|---|---|---|
| 2,434,334 | Sheppard | Jan. 13, 1948 |
| 2,477,370 | Hana | July 26, 1949 |

OTHER REFERENCES

Technique of Microwave Measurements (vol. 11 of M. I. T. Radiation Laboratory Series), edited by C. G. Montgomery; copyright 1947, McGraw-Hill Book Company, New York; pages 171–175 relied on.